United States Patent [19]
Woolfolk

[11] Patent Number: 5,649,503
[45] Date of Patent: Jul. 22, 1997

[54] SQUIRREL CAGE HAVING A CYCLOMETER AND METHOD FOR MONITORING THE ACTIVITY OF AN ANIMAL

[76] Inventor: Kevin Woolfolk, 35 Jennifer Dr., Glen Carbon, Ill. 62034

[21] Appl. No.: 398,658

[22] Filed: Mar. 3, 1995

[51] Int. Cl.⁶ .................................................. A01K 15/02
[52] U.S. Cl. .................................................. 119/700
[58] Field of Search ............................. 119/700, 702, 119/703, 704; 482/54; 472/32, 33, 35; 235/103

[56] References Cited

U.S. PATENT DOCUMENTS

| | | | |
|---|---|---|---|
| 3,682,477 | 8/1972 | Harkins | 119/702 |
| 4,389,047 | 6/1983 | Hall | 272/69 |
| 4,498,421 | 2/1985 | Lovitt | 119/700 X |
| 5,125,361 | 6/1992 | Rowlands | 119/700 |

FOREIGN PATENT DOCUMENTS

| | | | |
|---|---|---|---|
| 1514287 | 10/1989 | U.S.S.R. | 119/700 |
| 1644839 | 4/1991 | U.S.S.R. | 119/704 |

*Primary Examiner*—Thomas Price
*Attorney, Agent, or Firm*—Senniger, Powers, Leavitt & Roedel

[57] ABSTRACT

A squirrel cage has a support including a base adapted to rest on a flat surface. The base has support arms extending upwardly from the base, and a cylinder, having an inner radius, supported by the support arms of the base for relative rotation with respect to the base when an animal, such as a hamster, runs on the inner radius of the cylinder. The cylinder has a support member having a centrally located opening for receiving the support arms of the base. A cyclometer has a sensor mounted on the support and a trigger mounted on the cylinder such that when the cylinder rotates, the trigger passes near the sensor. The trigger actuates the sensor when it passes the sensor. The sensor of the cyclometer counts the number of rotations of the cylinder when the trigger actuates the sensor. A method of the present invention monitors the activity of the animal.

11 Claims, 3 Drawing Sheets

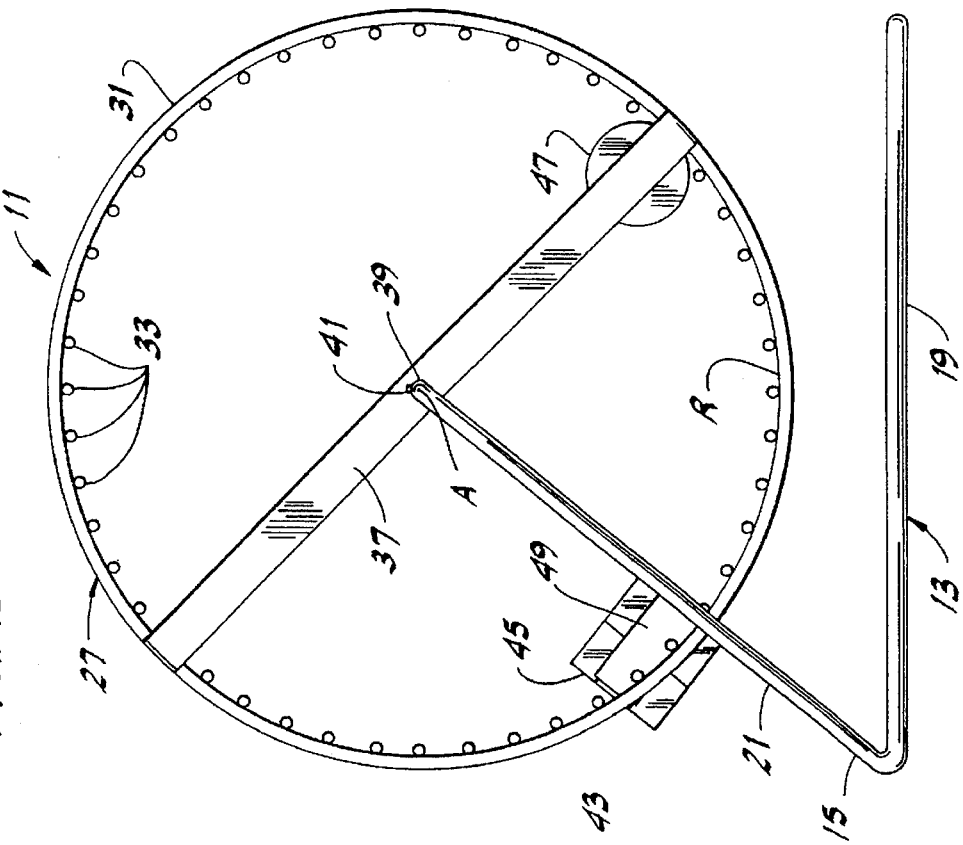
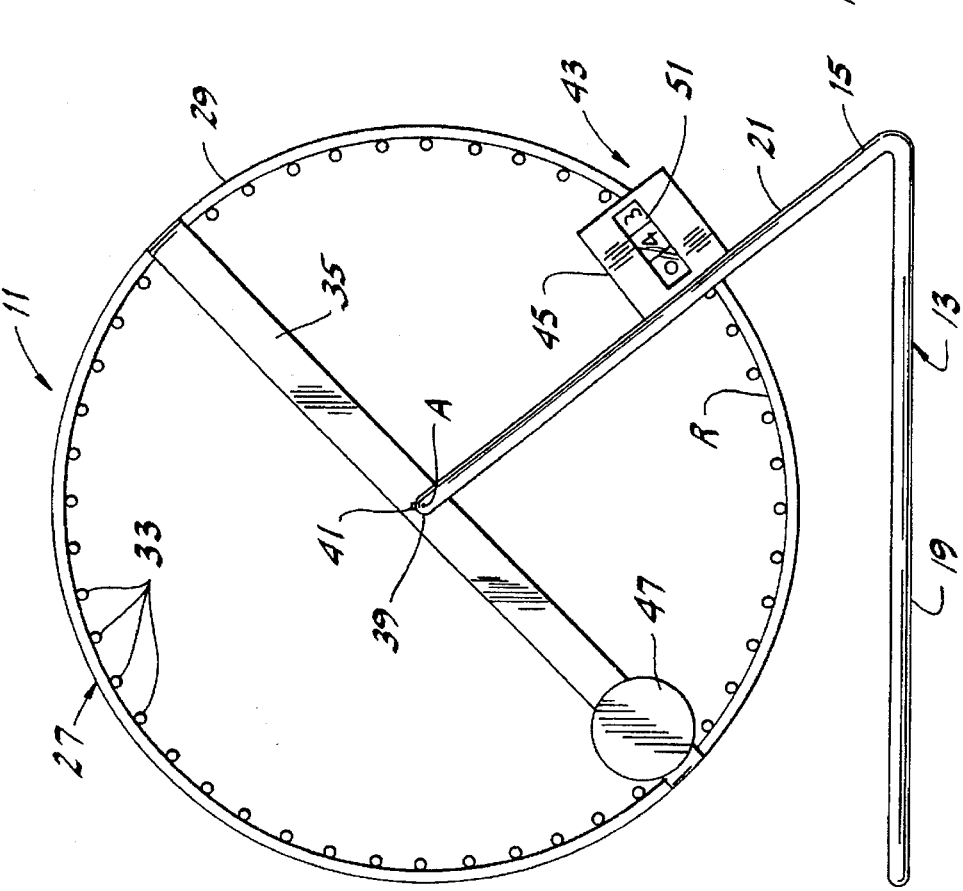

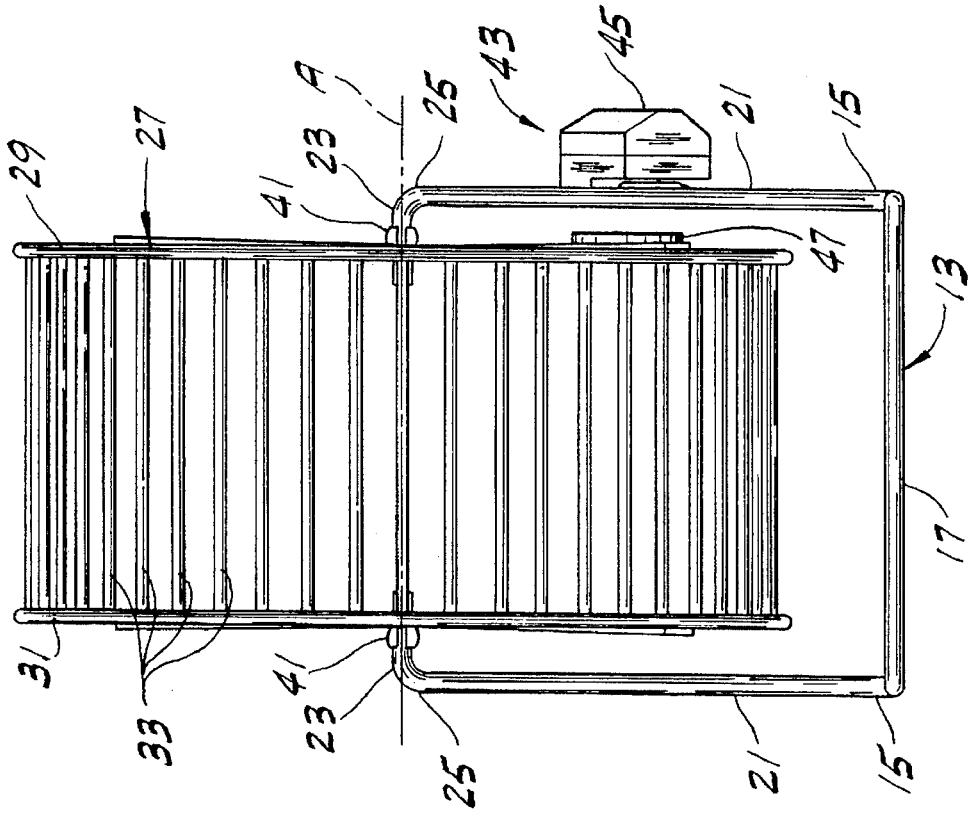
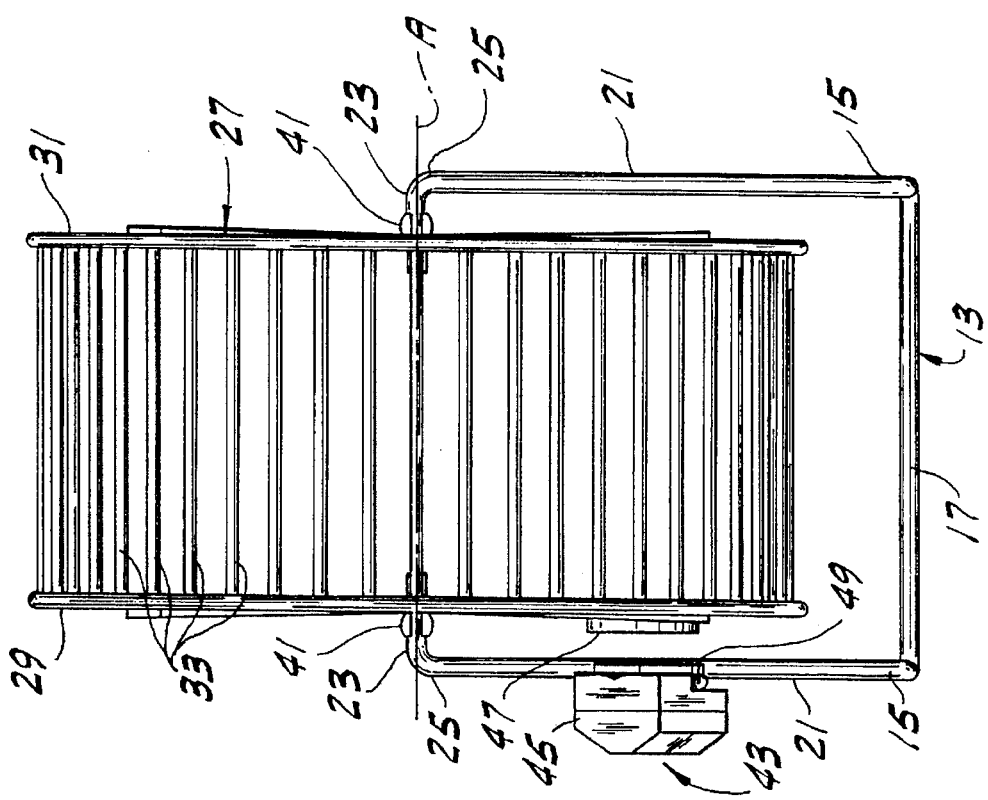

SQUIRREL CAGE HAVING A CYCLOMETER AND METHOD FOR MONITORING THE ACTIVITY OF AN ANIMAL

BRIEF SUMMARY OF THE INVENTION

This invention relates generally to squirrel cages, and more particularly to a squirrel cage having a cylinder and a cyclometer for counting the number of revolutions of the cylinder when an animal, such as a hamster or gerbil, is exercising.

A squirrel cage is an apparatus for a small animal, such as a hamster, gerbil, mouse, rat, squirrel or the like, having a rotatable cylinder supported by a suitable structure. The animal runs on the inner radius of the cylinder for exercising and for the enjoyment of the animal owner.

Among the several objects of the present invention may be noted the provision of a squirrel cage having a counter for counting the number of rotations of a cylinder of the squirrel cage; the provision of such a squirrel cage having a counter which is capable of monitoring the exercise of an animal, such as a hamster or gerbil; the provision of such a squirrel cage which is educational and entertaining for children who own small pets that use the squirrel cage; and the provision of such a squirrel cage having a counter which is simple in construction and easy to use.

In general, a squirrel cage comprises a support including a base adapted to rest on a flat surface. The base has support arm means extending upwardly from the base, and a cylinder, having an inner radius, supported by said support arm means of the base for relative rotation with respect to the base when an animal, such as a hamster, gerbil, mouse or the like, runs on the inner radius of the cylinder. The cylinder has a support member having a centrally located opening for receiving said support arm means of the base. The support member extends between the arm and the cylinder to mount the cylinder on the support arm for rotation relative to the support arm and base. The improvement comprises a cyclometer having a sensor mounted on the support and a trigger mounted on the cylinder such that when the cylinder rotates, the trigger passes near the sensor. The trigger actuates the sensor when it passes the sensor. The sensor of the cyclometer counts the number of rotations of the cylinder when the trigger actuates the sensor.

In another aspect of the invention, a method of monitoring the activity of an animal such as a hamster, gerbil, mouse or the like in a squirrel cage comprises the steps of: (a) providing a squirrel cage of the type having a support for supporting a rotatable cylinder, the cylinder rotating when the animal runs on the inner radius of the cylinder; (b) providing a cyclometer having a sensor mounted on the support and a trigger mounted on the cylinder such that when the cylinder rotates, the trigger passes near the sensor and actuates the sensor, the sensor of the cyclometer counting the number of rotations of the cylinder when the trigger actuates the sensor; (c) displaying the number of revolutions on a display of the cyclometer; and (d) recording the displayed number of revolutions at predetermined intervals thereby to establish the activity of the animal during that interval.

Other objects and features will be in part apparent and in part pointed out hereinafter.

BRIEF DESCRIPTION OF THE DRAWINGS

FIG. 1 is a front elevation of a squirrel cage of the present invention;

FIG. 2 is a rear elevation of the squirrel cage;

FIG. 3 is a right side elevation of the squirrel cage;

FIG. 4 is a left side elevation of the squirrel cage;

Corresponding parts are designated by corresponding reference numerals in the several views of the drawings.

DETAILED DESCRIPTION OF THE PREFERRED EMBODIMENT

Figure 5:
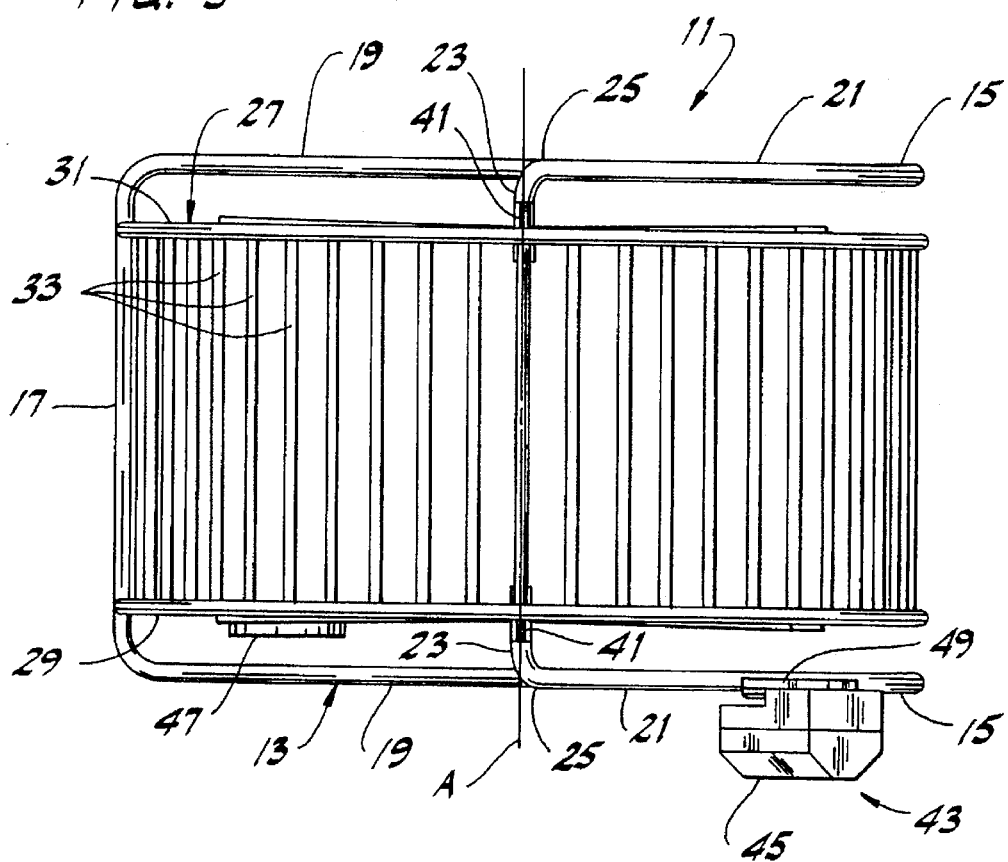
FIG. 5 is a top plan of the squirrel cage.

Referring to the drawings, there is generally indicated at 11 a squirrel cage of the present invention. The cage is suited for small animals, such as hamsters, gerbils, mice, rats, squirrels or the like. Such cages provide enjoyment to the animal's owner, which in most instances are small children.

As illustrated in the drawings, the squirrel cage 11 includes a support comprising a base, generally indicated at 13, made from relatively rigid wire-like material. In the present embodiment, the base 13 is made from metal wire, however, it is to be understood that other materials may be used, such as plastic material. The base 13 comprises two spaced-apart, generally V-shaped support arms (as viewed in FIGS. 1 and 2), each designated 15, attached at respective ends to a connecting member 17. Each support arm 15 has a lower leg 19 connected at one of its ends to the connecting member 17 and an upper leg 21 connected at its other end to the lower leg. In the shown embodiment, support arms 15 and connecting member 17 are formed as one piece as by a bending operation. It should be noted that the base 13 may also be formed from multiple pieces welded together.

Figure 6:
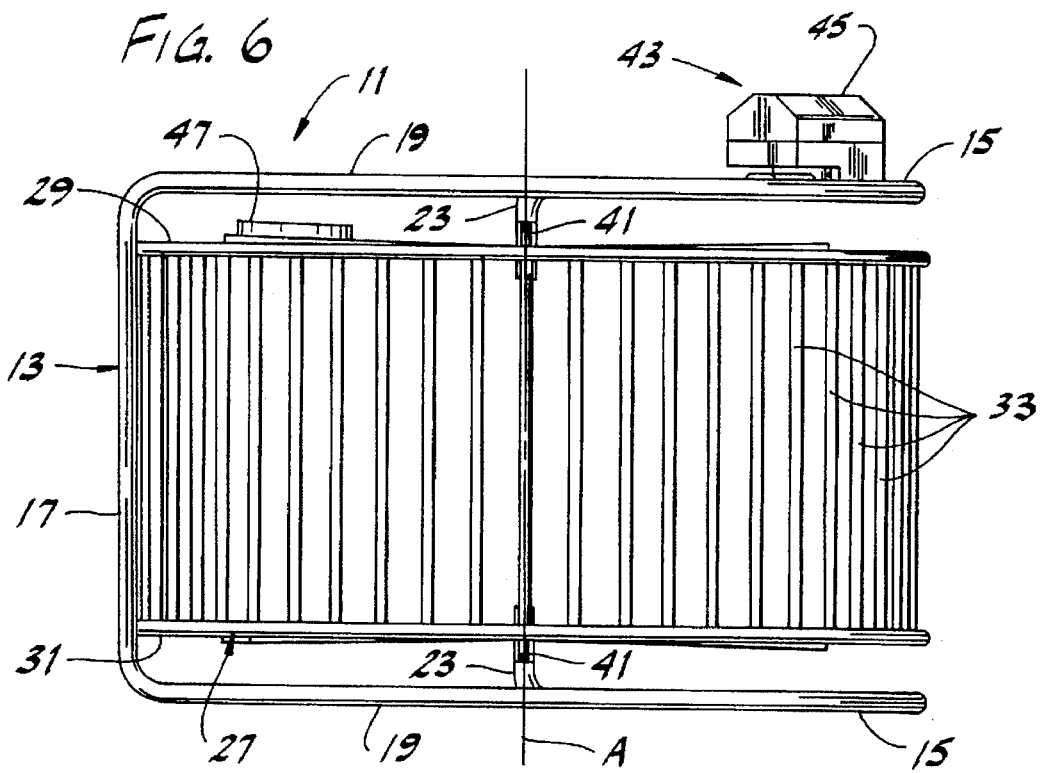
FIG. 6 is a bottom plan of the squirrel cage.

The lower legs 19 of the support arms 15 and the connecting member are generally U-shaped as viewed from underneath (see FIG. 6) and are constructed to rest flat on a horizontal surface. As illustrated in FIGS. 1 and 2, the upper legs 21 of the support arms 15 extend from their respective lower legs 19 upwardly and at an angle (e.g., 45° as shown) with respect to the lower legs. The free end portions of the upper legs 21 of the support arms 15, each designated 23, are bent at 25 towards one another and extend along a generally horizontal axis A. Each end portion 23 is also generally perpendicular to the plane of its respective support arm 15.

A cylinder, also made from rigid wire-like material and having an inner radius R, is generally indicated at 27. The cylinder 27 is supported by the support arms 15 of the base 13 for relative rotation with respect to the base when the animal runs on the inner radius R. As shown in FIGS. 3–6, the cylinder 27 includes a pair of spaced-apart circular rims 29, 31 which are interconnected by a plurality of cross members 33. The cylinder 27 of the shown embodiment has a diameter of 6.875 inches and has a width of 3.75 inches. It is to be understood that the squirrel cage 11 of the present invention may be constructed differently and embody varying dimensions and still fall within the scope of the present invention.

The cylinder 27 further includes a pair of laterally opposite support members 35, 37 which span the diameter of the open sides of the cylinder in planes parallel to the open sides. As illustrated in FIG. 3, support member 35 spans the left-hand open side of the cylinder 27 and support member 37 spans the right-hand open side of the cylinder. Each support member 35, 37 has an opening (each designated 39) located in the middle of the support member (i.e., the center point of the cylinder). Openings 39 correspond with axis A and receive a respective free end portion 23 of a support arm 15 therethrough for supporting the cylinder 27. This construction enables the cylinder 27 to rotate relative to the base 13 when an animal runs along the cylinder's inner radius R. Each support arm 15 has a detent 41 spaced outwardly from the end of the free end portion 23 for limiting the lateral movement of the cylinder 27 relative to the base 13. As illustrated in FIGS. 3 and 4, each detent 41 is located on its free end portion 23 in a position laterally outboard with respect to its respective support member 35, 37.

A cyclometer, generally indicated at 43, is provided to count the number of revolutions of the cylinder 27. The cyclometer 43 comprises a magnetically responsive sensor 45 mounted on one of the support arms 15 (the left-hand support arm as illustrated in FIG. 3) and a trigger magnet 47 mounted on support member 35 adjacent rim 29 of the cylinder 27. More specifically, the sensor 45 is attached (e.g., by glue) to a mounting tab 49 provided on the support arm 15. For metal squirrel cages, the mounting tab 49 is welded on support arm 15. For plastic squirrel cages, the support arm 15 of the cylinder 27 may be preformed with the mounting tab. The sensor 45 counts a complete rotation of the cylinder 27 when the magnet 47 passes it. The magnet 47 is attached (e.g., by glue) to the support member 35 a specified distance from centerline A so that it passes close to the magnetically responsive sensor 45. As shown in FIGS. 3 and 4, the magnet 47 passes near the sensor 45 as it rotates and approaches the sensor.

When the magnet 47 passes the sensor 45, the magnet actuates the sensor so that the sensor registers a count to a running number of counts which represent the number of times the cylinder has rotated. The sensor 45 is capable of counting the rotation of the cylinder 27 regardless as to whether it is rotating clockwise or counterclockwise. As shown in FIGS. 3 and 4, the magnet 47 is positioned on the mounting tab 49 of the cylinder 27 so that it nearly touches the sensor when it passes the sensor. The proximity of the magnet 47 to the sensor 45 is dependent on the strength of the magnet and the magnetic responsiveness of the sensor. It is to be understood that any number of sensing devices may be used to sense the complete revolution of the cylinder 27. For instance, a photoelectric sensor may be used for sensing purposes. Also, a mechanically actuated counter may be used as well.

As best illustrated in FIG. 1, the sensor 45 has a display 51 for displaying the running count of revolutions of the cylinder 27. The sensor 45 and display 51 arrangement of the present embodiment is a rotational counter which is a mechanically operative counting device well-known in the art of counting devices. Upon the sensor 45 sensing the passing of the magnet 47 thereby, the rotational counter registers one count and displays it on display 51. It should be noted that a battery or solar operated digital counting device (and sensing device) having an electronic display may also be used instead of the rotational counter. It is envisioned that the sensor 45 may have a reset button (not shown) for resetting the running count to zero.

A person may obtain the distance travelled by the animal by converting the number of revolutions counted. Alternatively, instead of displaying the number of revolutions of the cylinder 27, the display 51 of the sensor 45 may show the linear distance travelled by the inner radius of the cylinder. One way of accomplishing this is to reduce the diameter of the cylinder to 3.82 inches which results in one foot of travel for each revolution of the cylinder. Another way is to program the sensor to convert the number of revolutions to linear feet.

From the foregoing, it will be observed that the squirrel cage 11 of the present invention is capable of monitoring the activity of an animal in the squirrel cage. The squirrel cage 11 is provided with a cyclometer 43 which counts the number of rotations of the cylinder 27 of the cage and displays the number on a display 51 of the cyclometer. From this, a person may monitor the activity of the animal by viewing the running count shown on display 51, and record the displayed number of revolutions at predetermined intervals thereby to establish the activity of the animal during that interval. For example, a person may record the activity of the animal each day and track the average daily activity of the animal. As mentioned above, the person may convert the number of cycles counted to a distance, or in other embodiments, may record the distance directly from the display 51 of the sensor 45.

In view of the above, it will be seen that the several objects of the invention are achieved and other advantageous results attained.

As various changes could be made in the above constructions and method without departing from the scope of the invention, it is intended that all matter contained in the above description or shown in the accompanying drawings shall be interpreted as illustrative and not in a limiting sense.

What is claimed is:

1. In a squirrel cage of the type comprising a support including a base adapted to rest on a flat surface, said base having support arm means extending upwardly from the base, and a cylinder, having an inner radius, supported by said support arm means of the base for relative rotation with respect to the base when an animal runs on the inner radius of the cylinder, said cylinder having a support member, having a centrally located opening for receiving said support arm means of the base, the support member extending between the support arm means and the cylinder to mount the cylinder on the support arm means for rotation relative to the support arm means and base, wherein the improvement comprises a cyclometer having a sensor mounted on the support and a trigger mounted on the cylinder such that when the cylinder rotates, the trigger passes near the sensor, said trigger actuating said sensor when it passes the sensor, said sensor of the cyclometer counting the number of rotations of said cylinder when said trigger actuates the sensor.

2. A squirrel cage as set forth in claim 1 wherein said trigger comprises a magnet, said sensor being magnetically responsive so that it is activated upon passing of the magnet near the sensor for counting the revolutions of the cylinder.

3. A squirrel cage as set forth in claim 1 wherein said sensor of the cyclometer comprises a display for displaying the running count of revolutions of the cylinder.

4. A squirrel cage as set forth in claim 1 wherein said support arm means comprises a free end portion extending generally horizontally through the respective opening of the support member for supporting the cylinder, and wherein the support arm comprises detent means for limiting the lateral movement of the cylinder relative to the base.

5. A squirrel cage as set forth in claim 1 further comprising a mounting tab on the support arm means for receiving the sensor.

6. A squirrel cage comprising
a support including a base adapted to rest on a flat surface, said base having support arm means extending upwardly from the base, and a cylinder, having an inner radius, supported by said support arm means of the base for relative rotation with respect to the base when an animal runs on the inner radius of the cylinder, said cylinder having a support member, having a centrally located opening for receiving said support arm means of the base, the support member extending between the support arm means and the cylinder to mount the cylinder on the support arm means for rotation relative to the support arm means and base, and a cyclometer having a sensor mounted on the support and a trigger mounted on the cylinder such that when the cylinder rotates, the trigger passes near the sensor, said trigger actuating said sensor when it passes the sensor, said sensor of the cyclometer counting the number of rotations of said cylinder when said trigger actuates the sensor.

7. A squirrel cage as set forth in claim 6 wherein said trigger comprises a magnet, said sensor being magnetically responsive so that it is activated upon passing of the magnet near the sensor for counting the revolutions of the cylinder.

8. A squirrel cage as set forth in claim 6 wherein said sensor of the cyclometer comprises a display for displaying the running count of revolutions of the cylinder.

9. A squirrel cage as set forth in claim 6 wherein said support arm means comprises a free end extending generally horizontally through the respective opening of the support member for supporting the cylinder, and wherein the support arm comprises detent means for limiting the lateral movement of the cylinder relative to the base.

10. A squirrel cage as set forth in claim 6 further comprising a mounting tab on the support arm means for receiving the sensor.

11. A method of monitoring the activity of an animal in a squirrel cage, said method comprising the steps of providing a squirrel cage of the type having a support for supporting a rotatable cylinder, said cylinder rotating when the animal runs on the inner radius of said cylinder, providing a cyclometer having a sensor mounted on the support and a trigger mounted on the cylinder such that when the cylinder rotates, the trigger passes near the sensor and actuates said sensor, said sensor of the cyclometer counting the number of rotations of said cylinder when said trigger actuates the sensor, displaying the number of revolutions on a display of the cyclometer, and recording the displayed number of revolutions at predetermined intervals thereby to establish the activity of the animal during that interval.

\* \* \* \* \*